US008531709B2

(12) United States Patent
Okamura et al.

(10) Patent No.: US 8,531,709 B2
(45) Date of Patent: Sep. 10, 2013

(54) INFORMATION-DISPLAYING SYSTEM AND INFORMATION DISPLAY METHOD

(75) Inventors: Kinko Okamura, Nagano (JP); Emi Kondo, Tokyo (JP); Kazunobu Nimura, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 271 days.

(21) Appl. No.: 13/173,605

(22) Filed: Jun. 30, 2011

(65) Prior Publication Data

US 2012/0044525 A1  Feb. 23, 2012

(30) Foreign Application Priority Data

Jul. 1, 2010 (JP) ................................. 2010-150832

(51) Int. Cl.
G06F 3/12 (2006.01)
G06K 15/00 (2006.01)

(52) U.S. Cl.
USPC ........ 358/1.15; 358/1.18; 358/1.14; 358/1.13

(58) Field of Classification Search
None
See application file for complete search history.

(56) References Cited

U.S. PATENT DOCUMENTS

| 5,363,204 | A * | 11/1994 | Millman | 358/406 |
| 5,602,625 | A | 2/1997 | Okamoto et al. | |
| 6,490,052 | B1 * | 12/2002 | Yanagidaira | 358/1.15 |
| 2004/0105116 | A1 * | 6/2004 | Kim | 358/1.14 |
| 2004/0186598 | A1 | 9/2004 | Tanaka | |
| 2005/0141006 | A1 * | 6/2005 | Aiyama | 358/1.13 |
| 2007/0019236 | A1 * | 1/2007 | Sando | 358/1.15 |
| 2011/0295946 | A1 * | 12/2011 | Otsuka | 709/203 |
| 2012/0054607 | A1 * | 3/2012 | Otsuka | 715/705 |

FOREIGN PATENT DOCUMENTS

| JP | 07-001790 A | 1/1995 |
| JP | 08-123259 A | 5/1996 |
| JP | 2003-177902 A | 6/2003 |

* cited by examiner

Primary Examiner — Dov Popovici
(74) Attorney, Agent, or Firm — Global IP Counselors, LLP

(57) ABSTRACT

An information-displaying system includes a server device, a printing device, and an information terminal device. The printing device includes a request-admitting part, a first generating part, and a first transmitting part. The server includes a first receiving part, a content determining part, a second generating part, a second transmitting part, and a second receiving part. The information terminal device includes a third receiving part, a display part, an operation-instructing part, and a third transmitting part. The second transmitting part is for transmitting generated link information to the information terminal device, and, in an instance in which a content transmission request regarding transmitted link information has been admitted from the information terminal device, for further transmitting content data to the information terminal device. The content data corresponds with a scope of the content to be displayed.

6 Claims, 4 Drawing Sheets

INFORMATION-DISPLAYING SYSTEM AND INFORMATION DISPLAY METHOD

CROSS-REFERENCE TO RELATED APPLICATIONS

This application claims priority to Japanese Patent Application No. 2010-150832 filed on Jul. 1, 2010. The entire disclosure of Japanese Patent Application No. 2010-150832 is hereby incorporated herein by reference.

BACKGROUND

1. Technological Field

The present invention relates to an information-displaying system and an information display method.

2. Background Technology

When a printer is newly purchased, the user must perform setup work so that the printer is put in a usable state. Also, in an instance in which a printer is used for a long time, the user must replace ink, replenish the printing paper, and perform other maintenance work.

In order to allow the user to perform the setup work or maintenance work of such description in a smooth manner, devices such as those shown in Patent Citation 1, Patent Citation 2, and Patent Citation 3 have been proposed. In these devices, the state of the printer is detected, and the user is shown a guidance image related to work procedures corresponding to the detected state.

Japanese Patent Application Publication No. 2003-177902 (Patent Citation 1) is an example of the related art.
Japanese Patent Application Publication No. 8-123259 (Patent Citation 2) is an example of the related art.
Japanese Patent Application Publication No. 7-1790 (Patent Citation 3) is an example of the related art.

SUMMARY

Problems to be Solved by the Invention

However, in an instance in which setup work or maintenance work is performed on the printer, a settings image or a similar image for performing the work is displayed on the display part of the printer. Therefore, it is necessary to switch the displayed image on the display part in order to display a guidance image, and the switching operation becomes complicated. Also, it is not possible to perform the setup work or the maintenance work while looking at the guidance image, and the printer can end up being operated in a manner that differs from the guidance in the guidance image. An advantage of the invention is to facilitate visual identification of the guidance image for setup work or maintenance work for a printing device such as a printer.

Means Used to Solve the Above-Mentioned Problems

The invention has been devised in order to solve at least some of the above-mentioned problems, and can be achieved according to embodiments or application examples described below.

APPLICATION EXAMPLE 1

An information-displaying system according to a first application example is an information-displaying system in which a server device, a printing device, and an information terminal device are connected so as to be capable of communication; the information-displaying system wherein the printing device has a request-admitting part for admitting a request to display content corresponding with a printer state; a first generating part for generating first information relating to the printer state in an instance in which the request for display is admitted by the request-admitting part; and a first transmitting part for transmitting the generated first information to the server device; the server device has a first receiving part for receiving the first information; a content-determining part for determining, based on the received first information, the content and scope of the content to be displayed; a second generating part for generating link information, to which the determined content and the scope of display uniquely correspond; a second transmitting part for transmitting the generated link information to the information terminal device, and, in an instance in which a content transmission request regarding the transmitted link information has been admitted from the information terminal device, for further transmitting content data to the information terminal device, the content data corresponding with the scope of the content to be displayed that corresponds to the link information; and a second receiving part for receiving the content transmission request from the information terminal device; and the information terminal device has a third receiving part for receiving the link information or the content data from the server device; a display part for displaying, in an instance in which the third receiving part receives the content data, the link information that has been received; and displaying, in an instance in which the third receiving part receives the link information, the content based on the content data that has been received; an operation-instructing part for admitting the content transmission request corresponding to the link information that has been displayed; and a third transmitting part for transmitting the content transmission request to the server device in an instance in which the operation-instructing part admits the content transmission request.

According to the aspect described above, the server device determines content corresponding with the state of the printing device, and the scope of content to be displayed, based on a content display request transmitted from the printing device; generates link information that uniquely corresponds to content and the scope of display; and transmits the link information to the information terminal device. The information terminal device receives and displays the link information, and transmits, to the server device, a content transmission request that corresponds to the displayed link information. The server device transmits, to the information terminal device, content data that corresponds with the scope of content to be displayed, based on the content transmission request; and the information terminal device receives the content data and displays the content that are based on the content data. Therefore, with regards to the content that corresponds to the state of the printing device, content data that correspond with the scope of display are determined by the server device based on the request from the printing device and displayed on the display part of the information terminal device based on the request from the information terminal device, and the user is accordingly readily able to visually identify the content that corresponds to the state of the printing device using the information terminal device.

APPLICATION EXAMPLE 2

An information-displaying system according to a second application example is an information-displaying system in which a server device, a printing device, and an information terminal device are connected so as to be capable of communication; the information-displaying system wherein the printing device has a first generating part for generating first information relating to a printer state; and a first transmitting part for transmitting the generated first information to the server device; the server device has a first receiving part for receiving the first information; a storage part for storing the received first information; a content-determining part for extracting from the storage part the first information linked to the information terminal device in an instance in which a link information transmission request relating to content is admitted from the information terminal device; and determining, based on the extracted first information, the content and a range of the content to be displayed; a second generating part for generating link information, to which the determined content and the display range uniquely correspond; a second transmitting part for transmitting the generated link information to the information terminal device, and, in an instance in which a content transmission request regarding the transmitted link information has been admitted from the information terminal device, for further transmitting content data to the information terminal device, the content data corresponding with the scope of the content to be displayed that corresponds to the link information; and a second receiving part for receiving the content transmission request from the information terminal device; and the information terminal device has a third receiving part for receiving the link information or the content data from the server device; a display part for displaying, in an instance in which the third receiving part receives the link information, the link information that has been received; and displaying, in an instance in which the third receiving part receives the content data, the content based on the content data that has been received; an instructing part for issuing an instruction for the link information transmission request or the content transmission request; and a third transmitting part for transmitting the link information transmission request or the content transmission request to the server device based on an instruction by the instructing part.

According to the aspect described above, the server device stores information relating to the state of the printing device; determines content corresponding with the stored information, and the scope of content to be displayed, based on the link information transmission request instructed by the information terminal device; generates link information that uniquely corresponds to the content and the scope of display; and transmits the link information to the information terminal device. The information terminal device receives and displays the link information, and transmits, to the server device, a content transmission request that corresponds to the displayed link information. The server device transmits, to the information terminal device, content data that corresponds with the scope of content to be displayed, based on the content transmission request; and the information terminal device receives the content data and displays the content that are based on the content data. Therefore, with regards to the content that corresponds to the state of the printing device, content data that correspond with the scope of display are determined by the server device based on the request from the printing device and displayed on the display part of the information terminal device based on the request from the information terminal device, and the user is accordingly readily able to visually identify the content that corresponds to the state of the printing device using the information terminal device.

THIRD APPLICATION EXAMPLE

In the information-displaying system according to the application examples described above, the first information can be at least one of printing device status information, operation history information with regards to the printing device, and identification information that uniquely corresponds with the printing device.

FOURTH APPLICATION EXAMPLE

In the information-displaying system according to the application examples described above, the content can be any of video information, text information, or image information.

FIFTH APPLICATION EXAMPLE

An information display method according to the present application example is a method for displaying information using a server device, a printing device, and an information terminal device connected so as to be capable of communication; the information display method including: admitting a request to display content that corresponds with a printer state; generating first information relating to the printer state in an instance in which the request for display is admitted by the printing device; transmitting the generated first information to the server device; receiving the first information; determining, based on the received first information, the content and scope of the content to be displayed; generating link information, to which the determined content and the scope of display uniquely correspond; transmitting the generated link information to the information terminal device; receiving the link information from the server device; displaying the received link information; admitting the content transmission request that corresponds to the link information; transmitting the content transmission request to the server device in an instance in which the information terminal device has admitted the content transmission request; receiving the content transmission request from the information terminal device; transmitting, to the information terminal device, content data corresponding with the scope of content to be displayed that corresponds to the link information, based on the received content transmission request; receiving the content data from the server device; and displaying the content based on the received content data.

According to a method of such description, the server device determines the content corresponding with the state of the printing device, and the scope of the content to be displayed, based on the content display request transmitted from the printing device; generates link information that uniquely corresponds to content and the scope of display; and transmits the link information to the information terminal device. The information terminal device receives and displays the link information, and transmits, to the server device, a content transmission request that corresponds to the displayed link information. The server device transmits, to the information terminal device, content data that corresponds with the scope of content to be displayed, based on the content transmission request; and the information terminal device receives the content data and displays the content that are based on the content data. Therefore, with regards to the content that corresponds to the state of the printing device, content data that correspond to the scope of display are determined by the server device based on the request from the printing device and displayed on the display part of the information terminal device based on the request from the information terminal device, and the user is readily able to visually identify the content that corresponds to the state of the printing device using the information terminal device.

SIXTH APPLICATION EXAMPLE

An information display method according to the present application example is a method for displaying information using a server device, a printing device, and an information terminal device connected so as to be capable of communication; the information display method including: generating first information relating to the printer state; transmitting the generated first information to the server device; receiving the first information; storing the received first information; transmitting, to the server device, a request for transmission of information relating to content; receiving the transmission request; extracting, in an instance in which the transmission request has been received, the first information linked to the information terminal device, and to determine the content and scope of the content to be displayed, based on the extracted first information; generating link information, to which the determined content and the scope of display uniquely correspond; transmitting the generated link information to the information terminal device; receiving the link information from the server device; displaying, in an instance in which the link information has been received, the link information that has been received; admitting the content transmission request that corresponds to the link information; transmitting the content transmission request to the server device in an instance in which the content transmission request has been admitted; receiving the content transmission request from the information terminal device; transmitting, to the information terminal device, content data corresponding with the scope of content to be displayed that corresponds to the link information; receiving the content data from the server device; and displaying the content based on the received content data.

According to a method of such description, the server device stores information relating to the state of the printing device; determines content, which corresponds with the stored information, and the scope of content to be displayed, based on the link information transmission request instructed by the information terminal device; generates link information that uniquely corresponds to the content and the scope of display; and transmits the link information to the information terminal device. The information terminal device receives and displays the link information, and transmits, to the server device, a content transmission request that corresponds to the displayed link information. The server device transmits, to the information terminal device, content data that corresponds with the scope of content to be displayed, based on the content transmission request; and the information terminal device receives the content data and displays the content that are based on the content data. Therefore, with regards to the content that corresponds to the state of the printing device, content data that correspond with the scope of display is determined by the server device based on the request from the printing device and displayed on the display part of the information terminal device based on the request from the information terminal device, and the user is accordingly readily able to visually identify the content that corresponds to the state of the printing device using the information terminal device.

DETAILED DESCRIPTION OF EXEMPLARY EMBODIMENTS

A content delivery system will now be described with reference to the accompanying drawings.

First Embodiment

Figure 1:
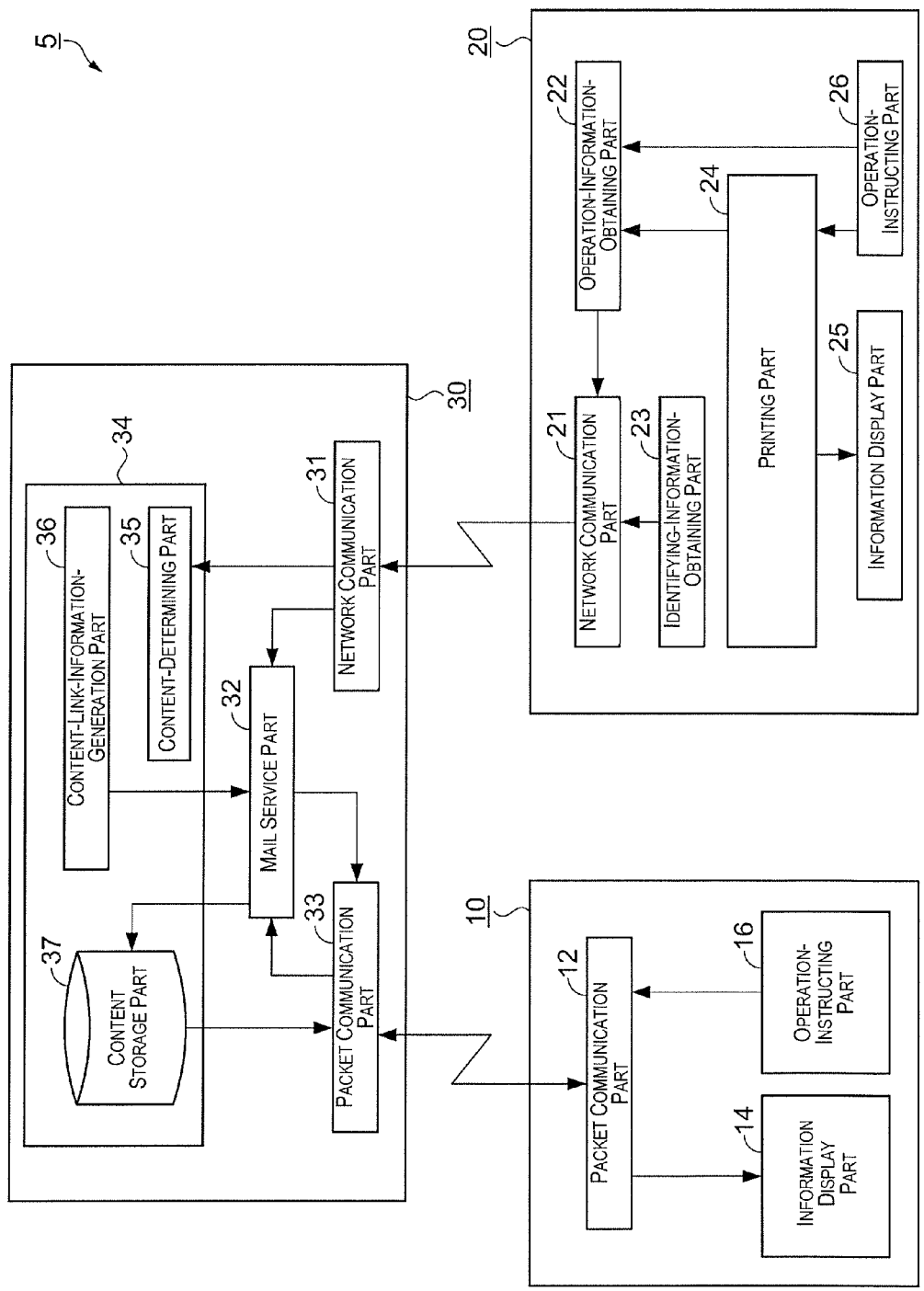
FIG. 1 is a drawing showing a configuration of functions of a content delivery system according to a first embodiment of the invention.

FIG. 1 is a drawing showing a configuration of functions of a content delivery system 5 according to a first embodiment. The content delivery system 5 includes a portable terminal 10, which functions as an information terminal device; a printer 20, which functions as a printing device; and a server device (hereafter referred to as a "server") 30. The portable terminal 10 and the server 30, and the printer 20 the server 30, are connected so as to be capable of communication. The content delivery system 5 is an embodiment of an information-displaying system. The content delivery system 5 displays information relating to the printer 20 on the portable terminal 10 owned by the user. In the first embodiment, the portable terminal 10 and the server 30 are connected via a mobile phone line or another mobile communication network, and the printer 20 and the server 30 are connected via a wireless local area network (LAN); however, the connection method is not limited to those described above. For example, a configuration is also possible in which a connection is achieved using, e.g., Bluetooth®, WiFi®, or a similar method.

Also, each of the portable terminal 10, the printer 20, and the server 30 includes a central processing unit (CPU), random access memory (RAM), read-only memory (ROM), a memory device, and other devices as hardware (not shown), wherein the hardware operate in coordination with software to achieve a variety of functions described further below. Each of the functions of the portable terminal 10, the printer 20, and the server 30 will now be described.

First, a description will be given for the function of the printer 20. The printer 20 includes a network communication part 21, an operation-information-obtaining part 22, an identifying-information-obtaining part 23, a printing part 24, an information display part 25, and an operation-instructing part 26. In the first embodiment, the printer 20 is presumed to be a single-function device. However, this is not provided by way of limitation; the printer 20 can also be a multifunction device provided with a scanner function or a copying function. In the operation-instructing part 26, the user operates an operation button or otherwise issues an instruction to each of the functional parts of the printer 20 to perform printing or another operation. The printer 20 includes a help button (not shown) as one of the operation-instructing parts 26. The help button is pressed when an error occurs in the printer 20 and the user wishes to learn the details of the error. The help button is also pressed when the method of operating the printer 20 is not known. In such an instance, the help button functions as a request-admitting part. The user presses the help button, whereby the help button admits a request for display of content that corresponds to the printer state.

The information display part 25 displays information necessary for the operation-instructing part 26 to instruct an operation. Also, in an instance in which an error of some type occurs in the printer 20, the information display part 25 displays information relating to the error that has occurred. In the present first embodiment, a liquid crystal panel of approximately several inches is assumed.

The network communication part 21 functions as a first transmitting part, and performs communication with the server 30 through a connection established via a wireless LAN or a similar network. The printing part 24 prints a print image on a paper sheet, based on an operation instruction sent from the operation-instructing part 26. In the present first embodiment, the printing method is assumed to be an ink-jet method, but this is not provided by way of limitation.

Pressing the help button of the operation-instructing part 26 triggers the operation-information-obtaining part 22 to obtain operation history information with regards to operation of the printer 20 by the user, and status information with regards to errors that occur in the printer 20. The obtained information is sent from the network communication part 21 to the server 30. In the present first embodiment, the help button represents the trigger for the operation-information-obtaining part 22 to obtain information. However, the trigger is not limited to the help button; it can be a variety of types of buttons arranged on the operation-instructing part 26.

The identifying-information-obtaining part 23 obtains information that can uniquely identify the printer 20, and adds the information to information that is sent (i.e., first information) when the operation-information-obtaining part 22 sends information to the server 30. In the present first embodiment, the identifying information is assumed to be a serial ID, which represents information for identifying the printer 20, but this is not provided by way of limitation. In the present embodiment, the operation-information-obtaining part 22 and the identifying-information-obtaining part 23 function as the first generating part.

Next, a description will be given for the function of the server 30. The server 30 includes a network communication part 31, a mail service part 32, a packet communication part 33, and a content service part 34. The content service part 34 includes a content-determining part 35, a content-link-information-generating part 36, and a content storage part 37. In the present first embodiment, the server 30 is configured from a single unit. However, this is not provided by way of limitation. The server 30 can be configured from a plurality of units, or can have a so-called cloud computing configuration provided with an application programming interface (API) for admitting various service requests. For example, the content service part 34 can be a service provided by a service server installed by the maker of the printer 20 in order to provide a service to users, and the mail service part 32 and the packet communication part 33 can be service provided by a base station installed by a telecommunication provider.

The network communication part 31 functions as a first receiving part, receives information sent from the printer 20, and sends the received information to the content service part 34. Information relating to the serial ID added to the information is sent to the mail service part 32.

Based on information sent from the printer 20, the content-determining part 35 determines content to be displayed from among the content stored in the content storage part 37. In the present first embodiment, the content is assumed to be video information, text information, still image information, and other types of information.

In an instance in which the information sent from the printer 20 is error status information, the content-determining part 35 determines content that indicates countermeasure methods in relation to errors; extracts, from the content, a region that corresponds to the error status information; and adds the extracted information to the link information described further below.

For example, in an instance in which the content is a video file related to an error with regards to the printing paper, and the error status information indicates a "paper blockage", the content-determining part 35 adds, to the link information, scope of display that indicates a countermeasure against "paper blockage" from the video file, i.e., information relating to the start frame position and the end frame position. Error items such as "paper blockage" and the scope of the video that corresponds to each of the error items are linked in advance in the form of a table, recorded, and referenced as required. The video file can also be divided so as to result in, e.g., a "paper blockage" countermeasure file. In such an instance, the whole of the region of the video file that can be played back represents the scope of the video.

Also, in an instance in which information sent from the printer 20 is the operation history information, the content-determining part 35 determines the content indicating the setting method, as well as using the operation history to extract, from the content, the portion that indicates the item to be set next, and adding the extracted portion to the link information. In an instance in which the content-determining part 35 judges, from the operation history, that a specific operation is being repeated, the content-determining part 35 can also determine the content that relates to the specific operation. The content-determining part 35 can also store information relating to past mistakes made by users, and determine the content in accordance to this information.

For example, in an instance in which the content is expressed in Extensible Markup Language (XML) or another markup language, information regarding the tag corresponding with the scope of display corresponding to the next item to be set is added to the link information.

The content can be of a configuration in which information to be displayed on the information display part 25 has been translated into a predetermined language. In this instance, the content-determining part 35 determines the language to be displayed based on user registration information for the printer 20. The content-determining part 35 can also ascertain an age band to which the user belongs based on the user registration information for the printer 20, and, e.g., in an instance in which the user is an elderly person, determine content that cater for elderly persons. Content recorded in the content storage part 37 of the server 30 can also be modified by the administrator of the server 30. For example, refreshing the content makes it possible to provide the user with countermeasure methods or guidance that have not been initially assumed.

The content-link-information-generating part 36 functions as a second generating part, and generates link information indicating access to the content determined by the content-determining part 35. In the present first embodiment, the link information represents file pass information or Uniform Resource Locator (URL) information for the content stored in the content storage part 37. The link information generated by the content-link-information-generating part 36 is sent to the mail service part 32.

In the present first embodiment, in an instance in which the scope of display is included in the link information, and content corresponding to the link information is transmitted to the portable terminal 10, the content service part 34 extracts only the data representing the scope of display, and transmits the data.

The mail service part 32 transmits, to an email address that corresponds to a serial ID, the link information that has been generated by the content-link-information-generating part 36. In the present first embodiment, the correspondence relationship between the printer 20 and the portable terminal 10, i.e., the serial ID and the email address corresponding to the serial ID, is registered in the server 30 in advance during user registration for the printer 20.

The packet communication part 33 functions as the second transmitting part, and performs packet communication with a communication counterpart (portable terminal 10) with which a wireless connection is established via a mobile communication network. In the present first embodiment, it is assumed that link information or content data are transmitted from the server 30 to the portable terminal 10, and that instruction signals generated in the portable terminal 10 are received.

Next, a description will be given for the function of the portable terminal 10. The portable terminal 10 is assumed to be a mobile telephone, a smartphone, a portable-type information processing device, or a similar device. The portable terminal 10 includes a packet communication part 12, an information display part 14, and an operation-instructing part 16. The packet communication part 12 functions as a third receiving part and a third transmitting part, and performs packet communication with respect to a communication part (i.e., the server 30) with which a wireless connection has been established via a mobile communication network.

The information display part 14 functions as a display part and displays e-mail or content transmitted from the server 30. In the present first embodiment, the information display part 14 includes an email client (i.e., email software) for handling email, or application software for displaying the detail of the content.

In the present first embodiment, the user operates email software, whereby an email sent from the server 30 is opened, and link information included in the emails is displayed on the information display part 14. The user operates the operation-instructing part 16 at this point. In an instance in which link information indicated by the email is selected using the operation-instructing part 16, the portable terminal 10 generates an email for selection information including a content transmission request, and sends the email to the server 30. In response, the server 30 transmits content data corresponding to the link information to the portable terminal 10.

With regards to the application software, in an instance in which the content data is a video file that has been compressed using a predetermined method, the compressed video file is subjected to an expansion process and restored, application software corresponding to the video file is activated, and content based on the restored data is displayed.

Figure 2:
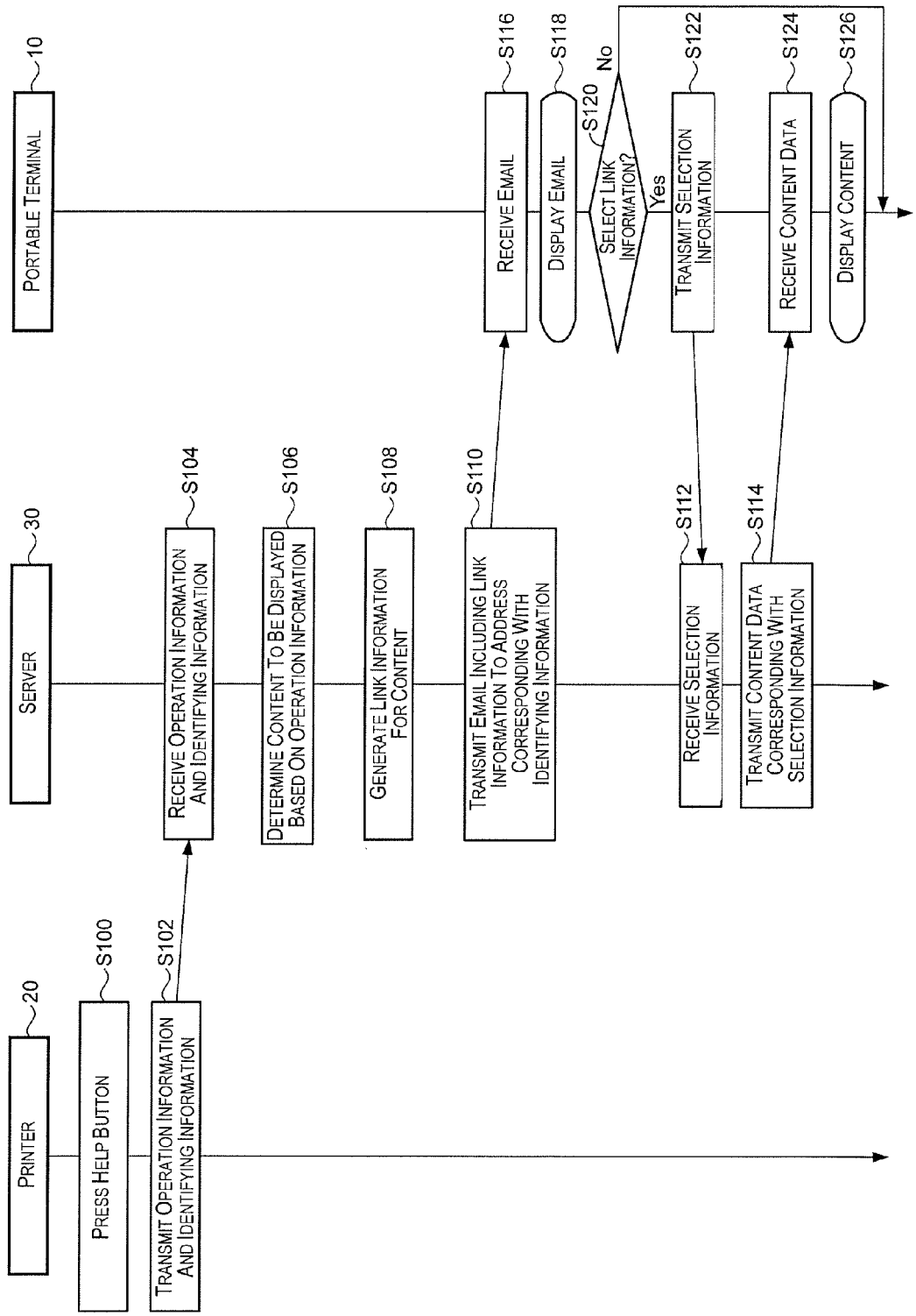
FIG. 2 is a flow chart showing the flow of processing by the content delivery system according to the first embodiment of the invention.

FIG. 2 is a flow chart showing the flow of processing by the content delivery system 5 according to the present first embodiment. First, the help button on the printer 20 is pressed by the user (step S100).

Next, the CPU of the printer 20 transmits the operation information and the identifying information to the server 30 (step S102).

The CPU of the server 30 receives the operation information and the identifying information transmitted from the printer 20 (step S104).

Next, the CPU of the server 30 determines, based on the received operation information, the content to be displayed (step S106).

Next, the CPU of the server 30 generates the link information for the content (step S108), and transmits an email including the generated link information to the address that corresponds with the identifying information (step S110).

Next, the CPU of the portable terminal 10 receives an email transmitted by the server 30 (step S116), and displays the received email (step S118). In this instance, the link information included in the email is also displayed.

Next, the CPU of the portable terminal 10 judges whether or not the user has selected the link information (step S120).

At this point, in an instance in which the user closes or deletes the displayed email, the CPU of the portable terminal 10 judges that the user will not select the link information ("No" at step S120), and the succession of processes are completed.

In contrast, in an instance in which the user clicks the link information in the displayed email, the CPU of the portable terminal 10 judges that the user has selected the link information ("Yes" at step S120) and transmits the selection information to the server 30 (step S122).

Subsequently, the CPU of the server 30 receives the selection information (step S112), and transmits, to the portable terminal 10, content data that is based on the content transmission request included in the selection information (step S114).

Next, the CPU of the portable terminal 10 receives the content data transmitted from the server 30 (step S124).

Next, the CPU of the portable terminal 10 displays the content based on the received content data (step S126), and the succession of processes are completed.

The first embodiment described above has the following effects.

(1) In an instance in which the printer 20 is operated and a state of error is generated, or in an instance in which the user has a question in relation to the method of setting or the method of operating the printer 20, the user presses the help button on the printer 20, whereby content indicating an appropriate method of response or operation is displayed on the portable terminal 10 held by the portable terminal 10. Therefore, the user is able to gain knowledge of an appropriate response method without the need to browse the printed operation instructions for the corresponding section, perform an online search on the Internet, or telephone a call center for the manufacturer of the printer 20.

(2) Since the content is displayed on its own portable terminal 10, there is no need to switch the information displayed on the information display part 25 of the printer 20. Therefore, the user is able to view the content in a state in which information displayed in the information display part 25 is maintained.

Second Embodiment

Next, a second embodiment of the invention will be described with reference to FIGS. 3 and 4.

Figure 3:
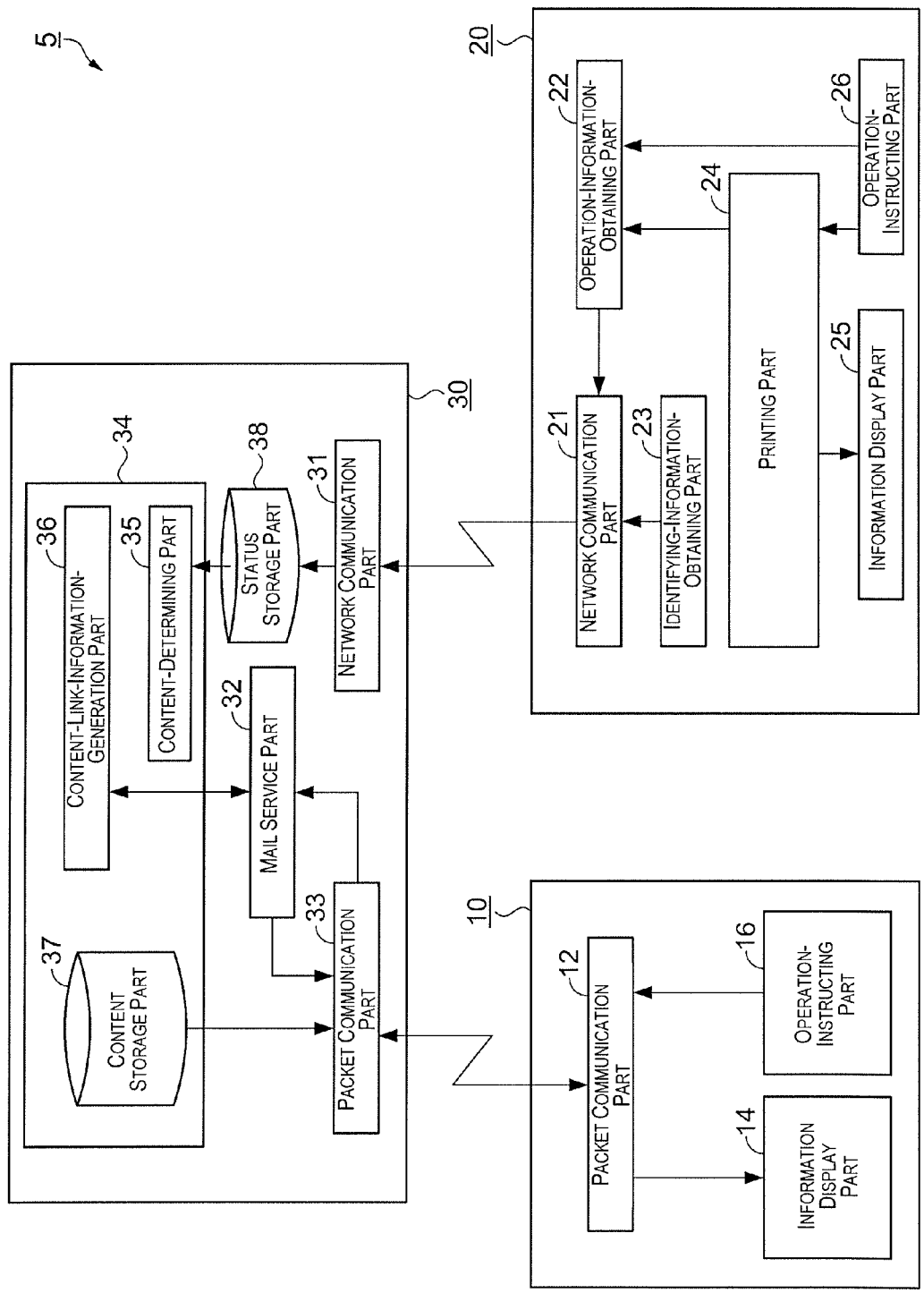
FIG. 3 is a drawing showing a configuration of functions of the content delivery system according to the second embodiment of the invention.

FIG. 3 is a drawing showing a configuration of functions of the content delivery system 5 according to the second embodiment. The server 30 includes a status storage part 38 in addition to the structures according to the first embodiment. The status storage part 38 functions as a storage part for storing status and other information.

In the first embodiment, the user pressing the help button of the printer 20 triggers the operation-information-obtaining part 22 to obtain the operation history information or the error status information. However, in the present second embodiment, the operation-information-obtaining part 22 obtains the operation history information or the error status information at predetermined time intervals, and the obtained information is transmitted to the server 30.

The server 30 receives the operation history information or the error status information transmitted from the printer 20, and stores the received information in the status storage part 38. This information stored in the status storage part 38 is stored, over a predetermined period that has been determined in advance, for each of the serial IDs of the printers 20.

In the first embodiment, the help button of the printer 20 being pressed down triggers the displaying of content on the portable terminal 10. However, in the present second embodiment, the pressing of a button arranged in the operation-instructing part 16 of the portable terminal 10 (e.g., a help button) is the trigger.

Specifically, when the help button on the portable terminal 10 is pressed by the user, an email indicating that the help button has been pressed is transmitted to the server 30. The mail service part 32 of the server 30 receives the email and obtains a serial ID that corresponds to the transmitted email address. The content-determining part 35 extracts the operation history information or the error status information that corresponds with the serial ID from the information stored in the status storage part 38, and determines the content that corresponds with the operation history information or the error status information.

Figure 4:
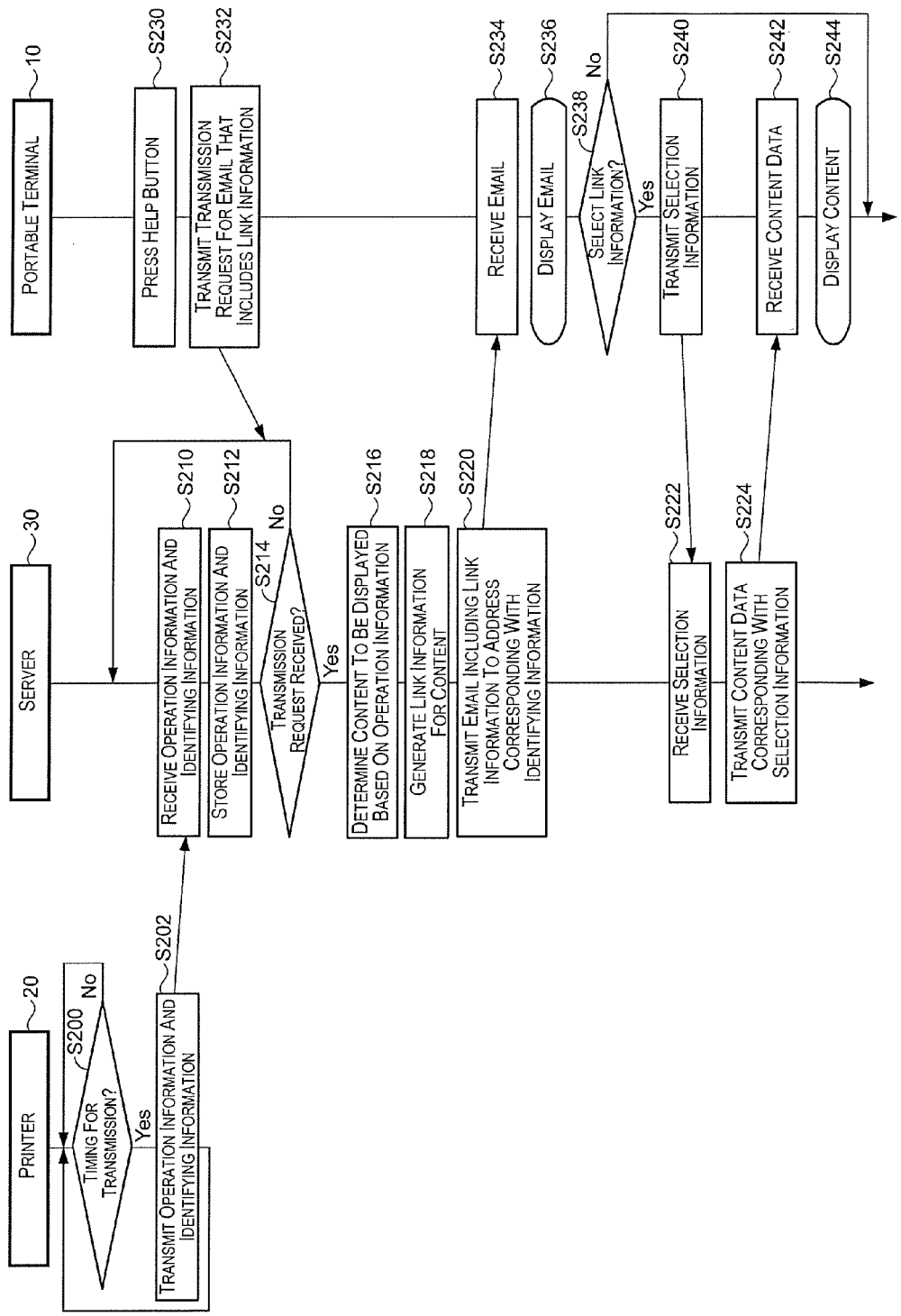
FIG. 4 is a flow chart showing the flow of processing by the content delivery system according to the second embodiment of the invention.

FIG. 4 is a flow chart showing the flow of processing by the content delivery system 5 according to the present second embodiment.

First, when the printer 20 is activated, the CPU of the printer 20 judges whether or not the present time corresponds to a timing at which the operation information and the identifying information are to be transmitted (step S200). In an instance in which it is judged that the present time does not correspond to a timing at which transmission is to be performed (i.e., "No" at step S200), step S200 is repeated.

In contrast, in an instance in which it is judged that the present time corresponds to a timing at which transmission is to be performed (i.e., "Yes" in step S200), the operation information and the identifying information are sent to the server 30 (step S202), and the flow returns to step S200.

Next, the CPU of the server 30 receives the operation information and the identifying information transmitted from the printer 20 (step S210), and stores the received information in the status storage part 38 (step S212).

Next, the CPU of the server 30 judges whether or not a transmission request has been received from the portable terminal 10 (step S214). In an instance in which it is judged that a transmission request has not been received ("No" in step S214), the flow returns to step S210, and the CPU of the server 30 receives the information from the printer 20.

At this point, the help button of the portable terminal 10 is pressed by the user (step S230). In response to the pressing, the CPU of the portable terminal 10 transmits, to the server 30, a request for transmission of an email including the link information (step S232).

In response, the CPU of the server 30 judges that a transmission request has been received from the portable terminal 10 ("Yes" in step S214), and determines, based on the received operation information, the content to be displayed (step S216).

Next, the CPU of the server 30 generates the link information for the content (step S218), and transmits an email including the generated link information to an address that corresponds with the identifying information (step S220).

Next, the CPU of the portable terminal 10 receives the email transmitted by the server 30 (step S234) and displays the received email (step S236). In this instance, the link information included in the email is also displayed.

Next, the CPU of the portable terminal 10 judges whether or not the user has selected the link information (step S238).

At this point, in an instance in which the user closes or deletes the displayed email, the CPU of the portable terminal 10 judges that the user will not select the link information ("No" at step S238), and the succession of processes are completed.

In contrast, in an instance in which the user clicks the link information in the displayed email, the CPU of the portable terminal 10 judges that the user has selected the link information ("Yes" at step S238) and transmits the selection information to the server 30 (step S240).

Subsequently, the CPU of the server 30 receives the selection information (step S222), and transmits, to the portable terminal 10, content data that corresponds to the selection information (step S224).

Next, the CPU of the portable terminal 10 receives the content data transmitted from the server 30 (step S242).

Next, the CPU of the portable terminal 10 displays the content that are based on the received content data (step S244), and the succession of processes are completed.

The second embodiment described above makes it possible to achieve similar effects to those of the first embodiment.

Although the invention has been described above based on the illustrated embodiments, the invention is not limited in scope to the present embodiments. The invention can be achieved using a single device or by combining a plurality of devices, and a variety of types of configurations are included.

What is claimed is:

1. An information-displaying system in which a server device, a printing device, and an information terminal device are connected so as to be capable of communication; the information-displaying system comprising the printing device including
a request-admitting part for admitting a request to display content corresponding with a printer state;
a first generating part for generating first information relating to the printer state in an instance in which the request for display is admitted by the request-admitting part; and
a first transmitting part for transmitting the generated first information to the server device;

the server device including
a first receiving part for receiving the first information;
a content determining part for determining, based on the received first information, the content and scope of the content to be displayed;
a second generating part for generating link information, to which the determined content and the scope of display uniquely correspond;
a second transmitting part for transmitting the generated link information to the information terminal device, and, in an instance in which a content transmission request regarding the transmitted link information has been admitted from the information terminal device, for further transmitting content data to the information terminal device, the content data corresponding with the scope of the content to be displayed that corresponds to the link information; and
a second receiving part for receiving the content transmission request from the information terminal device; and the information terminal device including
a third receiving part for receiving the link information or the content data from the server device;
a display part for displaying, in an instance in which the third receiving part receives the link information, the link information that has been received; and displaying, in an instance in which the third receiving part receives the content data, the content based on the content data that has been received;
an operation-instructing part for admitting the content transmission request corresponding to the link information that has been displayed; and
a third transmitting part for transmitting the content transmission request to the server device in an instance in which the operation-instructing part admits the content transmission request.

2. An information-displaying system in which a server device, a printing device, and an information terminal device are connected so as to be capable of communication; the information-displaying system comprising; wherein
   the printing device including
      a first generating part for generating first information relating to a printer state; and
      a first transmitting part for transmitting the generated first information to the server device;
   the server device including
      a first receiving part for receiving the first information;
      a storage part for storing the received first information;
      a content-determining part for extracting from the storage part the first information linked to the information terminal device in an instance in which a link information transmission request relating to content is admitted from the information terminal device; and determining, based on the extracted first information, the content and scope of the content to be displayed;
      a second generating part for generating link information, to which the determined content and the scope of display uniquely correspond;
      a second transmitting part for transmitting the generated link information to the information terminal device, and, in an instance in which a content transmission request regarding the transmitted link information has been admitted from the information terminal device, for further transmitting content data to the information terminal device, the content data corresponding with the scope of the content to be displayed that corresponds to the link information; and
      a second receiving part for receiving the content transmission request from the information terminal device; and
   the information terminal device including
      a third receiving part for receiving the link information or the content data from the server device;
      a display part for displaying, in an instance in which the third receiving part receives the link information, the link information that has been received; and displaying, in an instance in which the third receiving part receives the content data, the content based on the content data that has been received;
      an instructing part for issuing an instruction for the link information transmission request or the content transmission request; and
      a third transmitting part for transmitting the link information transmission request or the content transmission request to the server device based on the instruction by the instructing part.

3. The information-displaying system according to claim 1, wherein
   the first information is at least one of printing device status information, operation history information with regards to the printing device, and identification information that uniquely corresponds with the printing device.

4. The information-displaying system according to claim 1, wherein
   the content is any of video information, text information, or image information.

5. A method for displaying information using a server device, a printing device, and an information terminal device connected so as to be capable of communication; the information display method comprising:
   admitting a request to display content that corresponds with a printer state;
   generating first information relating to the printer state in an instance in which the request for display is admitted by the printing device;
   transmitting the generated first information to the server device;
   receiving the first information;
   determining, based on the received first information, the content and scope of the content to be displayed;
   generating link information, to which the determined content and the scope of display uniquely correspond;
   transmitting the generated link information to the information terminal device;
   receiving the link information from the server device;
   displaying the received link information;
   admitting a content transmission request that corresponds to the link information;
   transmitting the content transmission request to the server device in an instance in which the content transmission request has been admitted;
   receiving the content transmission request from the information terminal device;
   transmitting, to the information terminal device, content data corresponding with the scope of the content to be displayed that corresponds to the link information, based on the received content transmission request;
   receiving the content data from the server device; and
   displaying the content based on the received content data.

6. A method for displaying information using a server device, a printing device, and an information terminal device connected so as to be capable of communication; the information display method comprising:
   generating first information relating to a printer state;
   transmitting the generated first information to the server device;
   receiving the first information;
   storing the received first information;
   transmitting, to the server device, a request for transmission of information relating to content;
   receiving the transmission request;
   extracting, in an instance in which the transmission request has been received, the first information linked to the information terminal device, and to determine the content and scope of the content to be displayed, based on the extracted first information;
   generating link information, to which the determined content and the scope of display uniquely correspond;
   transmitting the generated link information to the information terminal device;
   receiving the link information from the server device;
   displaying, in an instance in which the link information has been received, the link information that has been received;
   admitting a content transmission request that corresponds to the link information;
   transmitting the content transmission request to the server device in an instance in which the information terminal device has admitted the content transmission request;
   receiving the content transmission request from the information terminal device;
   transmitting, to the information terminal device, content data corresponding with the scope of content to be displayed that corresponds to the link information;
   receiving the content data from the server device; and
   displaying the content based on the received content data.

\* \* \* \* \*